No. 870,381. PATENTED NOV. 5, 1907.
C. T. PAINTER.
CLUTCH MECHANISM.
APPLICATION FILED JAN. 4, 1907.
2 SHEETS—SHEET 1.
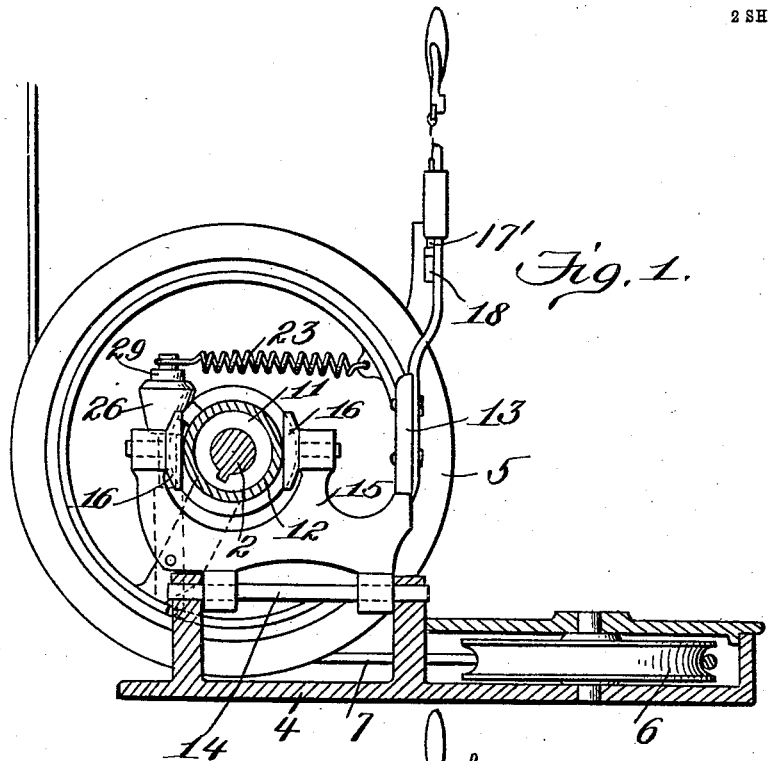
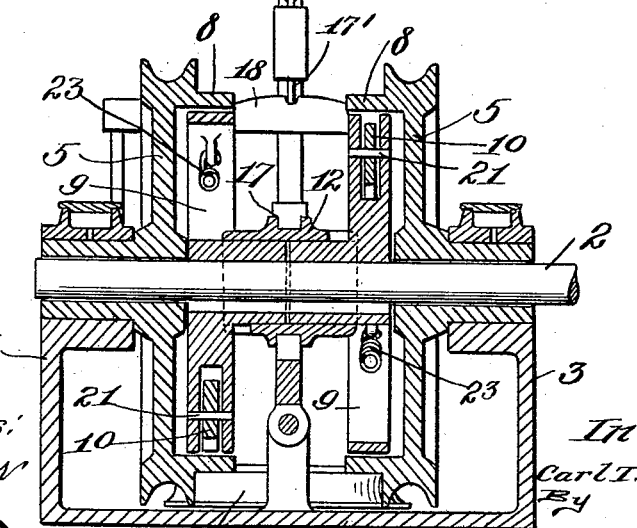
Witnesses: Inventor
Carl T. Painter
By James L. Norris
Atty.

No. 870,381. PATENTED NOV. 5, 1907.
C. T. PAINTER.
CLUTCH MECHANISM.
APPLICATION FILED JAN. 4, 1907.
2 SHEETS—SHEET 2.
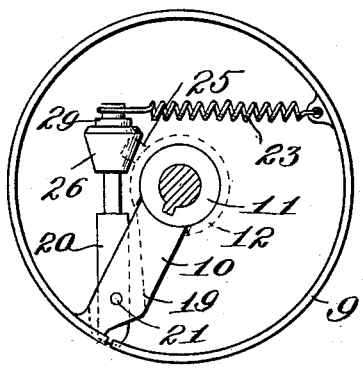
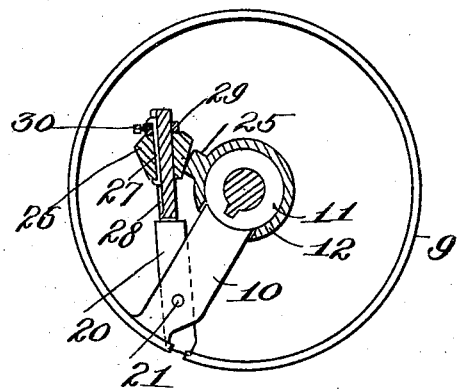
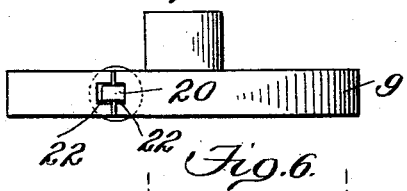
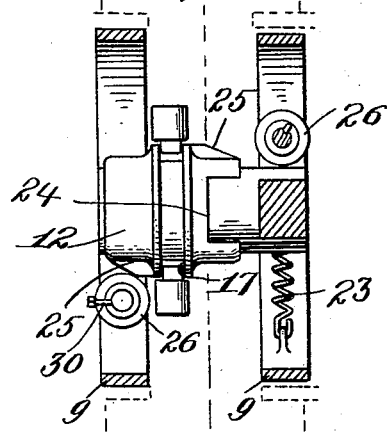
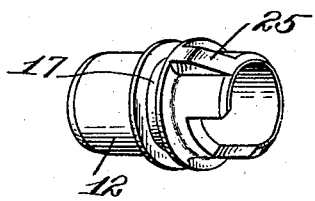
Witnesses:
Inventor
Carl T. Painter
By
James L. Norris
Atty

UNITED STATES PATENT OFFICE.

CARL T. PAINTER, OF CHATTANOOGA, TENNESSEE, ASSIGNOR TO PATTEN MANUFACTURING COMPANY, OF CHATTANOOGA, TENNESSEE, A CORPORATION OF TENNESSEE.

CLUTCH MECHANISM.

No. 870,381.

Specification of Letters Patent.

Patented Nov. 5, 1907.

Application filed January 4, 1907. Serial No. 350,778.

*To all whom it may concern:*

Be it known that I, CARL T. PAINTER, a citizen of the United States, residing at Chattanooga, in the county of Hamilton and State of Tennessee, have invented new and useful Improvements in Clutch Mechanism, of which the following is a specification.

This invention relates to clutch mechanism.

Clutch mechanism involving my invention may be incorporated with advantage in apparatus and machines of many different types. In order to indicate the many advantages of said clutch mechanism I have illustrated in the drawings accompanying and forming a part of this specification the same in conjunction with hoisting apparatus such as that disclosed in my contemporaneously pending application filed January 4, 1907, Serial No. 350,777, said clutch mechanism being simple in construction, effective in operation and readily and quickly operable.

In said drawings I have shown in detail one form of embodiment of said clutch mechanism which to enable those skilled in the art to practice the invention and for this purpose alone will be fully set forth in the following description while the novelty of the invention will be covered in the claims succeeding said description.

Referring to said drawings, Figure 1 is a sectional side elevation of hoisting apparatus such as that to which I have hereinbefore referred combined with clutch mechanism comprising my invention. Fig. 2 is a sectional rear elevation of the parts shown in the preceding view. Fig. 3 is an end side face view of a clutch in its inoperative relation. Fig. 4 is a substantially similar view of said clutch in its operative relation with certain of the parts in section. Fig. 5 is a view of said clutch as seen from the under sides of said Figs. 3 and 4 and in the relation in which it is shown in Fig. 3. Fig. 6 is a horizontal sectional plan view of the two clutches and an actuator therefor, and Fig. 7 is a perspective view of said actuator.
Like characters refer to like parts throughout the several figures.

In Figs. 1 and 2 I have partially shown hoisting apparatus constructed in accordance with the showing made in the application to which I have hereinbefore specifically referred and to indicate the utility of the clutch mechanism I will describe said apparatus but quite briefly, it being understood that the two are operatively associated. In fact the clutch mechanism constitutes in practice a part of the hoisting apparatus although such clutch mechanism may be utilized in other ways. In said Figs. 1 and 2, the numeral 2 designates a power shaft which may be operated in any desirable way and which is supported by standards as 3 rising from the bed 4. The power shaft is illus-
trated as loosely carrying two sheaves 5 set opposite each other and with which the clutch mechanism alternately coöperates. In addition to the sheaves 5 there is a pulley 6 which is set transversely to the sheaves and which serves to direct a cable as 7 from each sheave on to the other. The pulley 6 is in the present case rotatively supported by the bed 4.

It will be understood that in a hoisting apparatus of the type shown in the drawings it is necessary to employ two clutches and when one clutch is in engagement with one sheave 5, the other clutch is out of engagement with the corresponding sheave. The engagement between the sheaves and the clutches may be secured in any desirable way. For example, the sheaves may have on their inner faces annular flanges as 8 which inclose the two clutches, one of which will now be specifically described for which purpose particular reference may be had to Figs. 3, 4 and 5. When the structure of one of the clutches is fully set forth an understanding of the other will be reached for in the present instance they are of duplicate form. The clutch shown in said Figs. 3, 4 and 5 includes in its organization a split or divided ring as 9 which when the clutch is in operative relation is adapted to solidly engage against the inner face of the flange 8 throughout the entire extent of the two parts, except, of course, where there is a slight gap between the ends of the divided ring. From one end of the ring there extends inward an arm 10 which in the present case is disposed radially of the ring and which terminates at its inner end in a hub 11. Referring now more especially to Fig. 2 it will be seen that the two hubs 11 are placed around the shaft 2 with their inner ends almost in abutment so as to present in effect a substantially continuous sleeve upon which a clutch actuator as the sleeve 12 is adapted to travel. The two hubs 11 are illustrated as being rotatively connected with the shaft 2 for which purpose they may be keyed to said shaft. It will be clear that the two sheaves 5 are loose on said shaft, although either can be coupled thereto through the action of its coöperating clutch.

The sleeve 12 may be moved back and forth in any desirable way, for example, by a hand lever as 13 carried upon a pivot 14 suitably supported by bearings upon the base 4, said hand lever 13 having a yoke portion as 15, the branches of which are provided with shoes as 16 to enter a peripheral groove or channel as 17 in the sleeve 12. The hand lever 13 may be as shown provided with a detent as 17′ normally adapted to fit in an aperture in the plate 18 connected with the framework of the machine, such relation being illustrated clearly in Fig. 2. When the detent 17′ fits the aperture in said plate 18 the hand lever will be held in a neutral or central position so as to maintain said sleeve 12 in a corresponding position, at which time the sleeve is in its inoperative relation or in a position where it does not put either of the clutches in power transferring contact with the coöperating sheaves 5. When the hand lever 13 is swung over to the right in Fig. 2 from such central position the sheave 5 on the right will be clutched to the shaft 2 and when such hand lever is swung over to the left the sheave on the left will be clutched to said shaft, assuming that in each case sufficient movement is given to the lever, provision in practice being made to insure this result. It will be understood that before the hand lever 13 can be shifted it is necessary to disengage the detent 17' from the apertured plate 18 and that when said hand lever has been brought to its central position from either one of its shifted positions the detent 17' is caused to enter the aperture in the plate 18.

Referring again more particularly to Figs. 3, 4 and 5, the arm 10 therein shown has a diagonally disposed slot as 19 extending therethrough and through this slot a lever as 20 is extended, said lever being pivoted as at 21 to the arm 10. The outer portion of the lever 20 fits in opposite notches as 22 formed in the edges of the ring 9, by virtue of which torsional movement of the ring or the lateral spreading of the ends thereof will be prevented in order to insure proper lateral contact of the periphery of the ring throughout its entire extent with the appropriate sheave 5. In Fig. 3 the lever 20 is shown as occupying its normal position in which it may be retained by some suitable means as by the spring 23 connected with the outer end of said lever and with the ring. In practice when a working stroke is imparted to said lever 20 this will be in opposition to the spring 23 so that the toe of the lever will engage against the free end of the ring 9 to increase the gap between said end and the opposite end, as shown in Fig. 4, this causing in effect the expansion or circumferential enlargement of the ring 9, by reason of which the outer surface thereof can be put into engagement with practically the entire inner surface of a coöperating flange 8. The lever 20 as will hereinafter appear is given its working stroke by the sleeve 12 and the long branch thereof at this time is swung to the left in Fig. 3 to stretch the spring 23. When the lever 20 is freed from the action of the sleeve 12, such as when the latter has reached its neutral position to which I have hereinbefore referred, it will be then returned to its original position by the spring 23 thus permitting a relaxation of the resilient ring 9 or its resumption of its original condition of reduced circumference, by its inherent resiliency assisted in a measure by the pull of the spring 23. The ring 9, arm 10 and hub 11 may in practice and preferably are made in one piece; in fact they may be inexpensively cast together.

To return to the clutch actuator 12. It will be evident that this clutch actuator in the present instance operates in alternation the two clutches. It has at opposite sides of its vertical center apertures as 24 in which the arms 10 are adapted to fit, the parts being so related that one arm is at all times in an aperture, by reason of which the said sleeve is properly centered or positioned with respect to the two sleeves in order to insure proper action of the clutches by wedges as 25 on the sleeve. These wedges as shown clearly in Fig. 6 are set diametrically opposite each other and owing to the fact that provision is made for non-rotation of the sleeve 12 with respect to the two clutches said wedges 25 are always in position to act against the clutches when the sleeve 12 is moved longitudinally of the shaft 2 in the desired direction.

Referring now to Figs. 3 and 4 it will be seen that the lever 20 carries upon the outer arm or branch thereof an anti-friction roller as 26 of tapered form, the taper in the present case being inward. This roller 26 is adjustable longitudinally of the lever 20 so as to compensate for wear between the roller and the sleeve 12, the roller being naturally moved inward as such wear occurs. The anti-friction roller 26 is shown as surrounding a gib or key 27 fitted in and movable longitudinally of the key-way 28 as clearly shown in Fig. 4, the opposite ends of said gib or key being outwardly offset and the inner opposite portion being contiguous to the inner reduced end of the roller 26. Between the outer offset portion of said gib or key and the roller 26 and surrounding the lever 20 is a collar as 29 through which is tapped a set screw as 30 adapted to bind normally the gib 27 firmly in the key-way 28, thereby to prevent accidental movement of the roller 26 longitudinally of the lever. By loosening the screw 30 the roller can be adjusted longitudinally of the lever and when the adjustment is obtained the screw will be tightened to maintain the adjustment.

In Fig. 2 the collar 12 is in its neutral position neither of the two clutches shown in this figure at this time being in its operative condition. When, however, the sleeve 12 is moved over to the left by the action of the hand lever 13 the wedge 25 on the left of said sleeve will be caused to engage against the corresponding roller 26, as clearly shown in Fig. 6, to operate the clutch on the left in said figure in order to clutch the corresponding sheave to the shaft 2, the sheave 5 on the right in Fig. 6 being out of clutched relation with its shaft owing to the fact that the coöperating clutch at this time is inoperative. I have not shown the supporting shaft in Fig. 6, but have illustrated by dotted lines, portions of the two sheaves. In said Fig. 6, therefore, the resilient ring 9 on the left is shown expanded to its maximum diameter while the opposite ring is shown contracted to its minimum diameter.

What I claim is:

1. The combination of a wheel having a rim, a divided ring disposed within said rim and for directly engaging the latter, said ring being provided with a rigid arm at one end thereof and extending inward from said end substantially radially of the ring, and a lever, the arm having a slot through which said lever passes, the toe of the lever being positioned to engage the free end of the ring, the lever being pivoted to said arm and being operable to expand the ring to cause the same to engage said rim.

2. Clutch mechanism having a divided ring, and a lever to expand the ring, the opposite ends of the ring having notches in both of which the lever operates.

3. Clutch mechanism having a divided ring, a lever for expanding the ring having a key-way, a key movable in said key-way longitudinally of the lever and provided with offset ends, an anti-friction roller surrounding the lever and key, a collar between the outer offset end of the key and the anti-friction roller, and a holding screw tapped through the collar to engage against the key.

4. The combination of a wheel, a divided ring provided at one end with a rigid arm extending inward from said end substantially radially of the ring, a lever pivotally mounted upon the arm between the ends thereof, the toe of the lever being positioned to engage the free portion of the ring for expanding the same into clutching connection with the wheel, and a spring connected with the lever and the ring for operating the lever in a direction to cause the same to permit contraction of the ring.

5. The combination of a wheel having a rim, a divided ring disposed within said rim and for directly engaging the latter, said ring being provided with a rigid arm at one end thereof extending inward from said end and substantially radially of the ring, a lever pivotally mounted upon said arm between the ends thereof, the toe of the lever positioned to engage the free end of the ring for expanding the same into engagement with said rim, and a tapered anti-friction roller adjustably mounted on the lever.

6. The combination of a wheel having a rim, a divided ring disposed within said rim and for directly engaging the latter, said ring being provided with a rigid arm at one end thereof extending inward from said end and substantially radially of the ring, a lever pivotally mounted upon said arm between the ends thereof, the toe of the lever positioned to engage the free end of the ring for expanding the same into engagement with said rim, and a spring connected with the lever and the ring for operating the lever in a direction to cause the same to permit contraction of said ring.

In testimony whereof I have hereunto set my hand in presence of two subscribing witnesses.

CARL T. PAINTER.

Witnesses:
 LEWIS M. COLEMAN,
 J. K. HODGES.